US007722959B2

(12) United States Patent
Schlichting et al.

(10) Patent No.: US 7,722,959 B2
(45) Date of Patent: *May 25, 2010

(54) SILICATE RESISTANT THERMAL BARRIER COATING WITH ALTERNATING LAYERS

(75) Inventors: Kevin W. Schlichting, Storrs, CT (US); David A. Litton, Rocky Hill, CT (US); Michael J. Maloney, Marlborough, CT (US); Melvin Freling, West Hartford, CT (US); John G. Smeggil, Simsbury, CT (US); David B. Snow, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 815 days.

This patent is subject to a terminal disclaimer.

(21) Appl. No.: 11/516,389

(22) Filed: Sep. 6, 2006

(65) Prior Publication Data

US 2008/0057326 A1 Mar. 6, 2008

(51) Int. Cl.
*B32B 9/00* (2006.01)

(52) U.S. Cl. ....................... 428/469; 428/472; 428/701; 428/702; 416/241 B

(58) Field of Classification Search ....................... None
See application file for complete search history.

(56) References Cited

U.S. PATENT DOCUMENTS

| | | | | |
|---|---|---|---|---|
| 6,106,959 | A * | 8/2000 | Vance et al. | 428/623 |
| 6,294,260 | B1 * | 9/2001 | Subramanian | 428/469 |
| 6,808,761 | B2 | 10/2004 | Chaput et al. | |

FOREIGN PATENT DOCUMENTS

| | | | |
|---|---|---|---|
| EP | 1357201 | A1 | 10/2003 |
| EP | 1806431 | A2 | 7/2007 |
| EP | 1811060 | A2 | 7/2007 |
| EP | 1811061 | A2 | 7/2007 |
| EP | 1889949 | A2 | 2/2008 |
| WO | 0009778 | A1 | 2/2000 |

OTHER PUBLICATIONS

European Search Report dated Jul. 7, 2009.

* cited by examiner

*Primary Examiner*—Timothy M Speer
(74) *Attorney, Agent, or Firm*—Bachman & LaPointe, P.C.

(57) ABSTRACT

A thermal barrier coating system for use on a turbine engine component which reduces sand related distress is provided. The coating system comprises at least one first layer of a stabilized material selected from the group consisting of zirconia, hafnia, and titania and at least one second layer containing at least one of oxyapatite and garnet. Where the coating system comprises multiple first layers and multiple second layers, the layers are formed or deposited in an alternating manner.

43 Claims, 1 Drawing Sheet

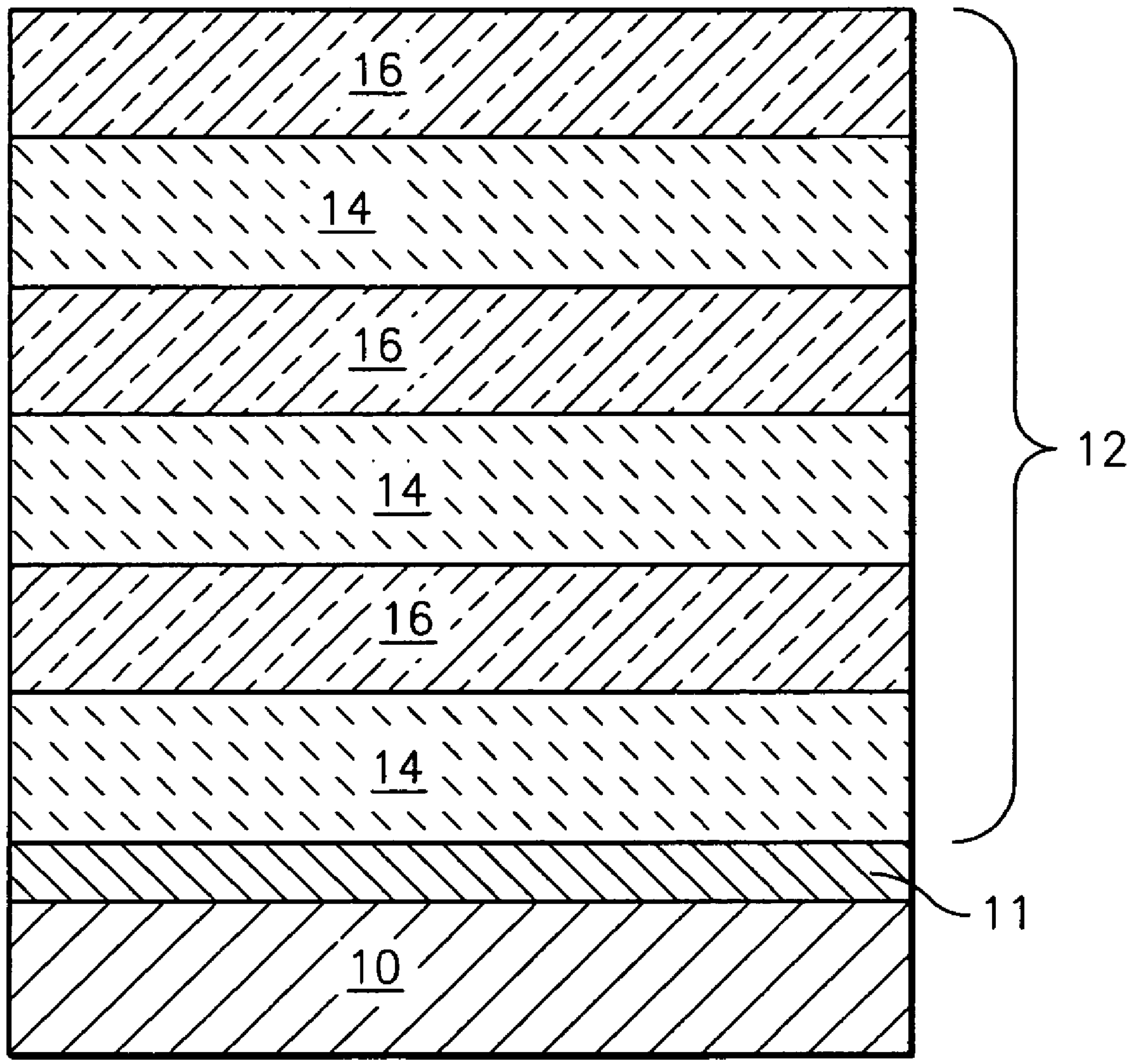
16
14
16
14
16
14
12
11
10

SILICATE RESISTANT THERMAL BARRIER COATING WITH ALTERNATING LAYERS

BACKGROUND OF THE INVENTION (1) Field of the Invention

The present invention relates to a thermal barrier coating having alternating layers of oxyapatite and/or garnet and yttria-stabilized zirconia which can be applied to a turbine engine component, to a method for forming the coating, and to a turbine engine component having the coating.

(2) Prior Art

The degradation of turbine airfoils due to sand related distress of thermal barrier coatings is a significant concern with all turbine engines used in a desert environment. This type of distress can cause engines to be taken out of operation for significant repairs.

Sand related distress is caused by the penetration of fluid sand deposits into the thermal barrier coatings which leads to spallation and accelerated oxidation of any exposed metal.

SUMMARY OF THE INVENTION

In accordance with the present invention, there is provided a coating system which reduces sand related distress on turbine engine components. The coating system broadly comprises alternating layers of oxyapatite and/or garnet and a stabilized zirconia, hafnia, or titania material. Herein, garnet refers broadly to an oxide with the ideal formula of $A_3B_2X_3O_{12}$, where A comprises at least one of the metals selected from the group consisting of $Ca^{+2}$, $Gd^{+3}$, $In^{+3}$, $Mg^{+2}$, $Na^{+}$, $K^{+}$, $Fe^{+2}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $Sc^{+2}$, $Y^{+2}$, $Ti^{+2}$, $Zr^{+2}$, $Hf^{+2}$, $V^{+2}$, $Ta^{+2}$, $Cr^{+2}$, $W^{+2}$, $Mn^{+2}$, $Tc^{+2}$, $Re^{+2}$, $Fe^{+2}$, $Os^{+2}$, $Co^{+2}$, $Ir^{+2}$, $Ni^{+2}$, $Zn^{+2}$, and $Cd^{+2}$; where B comprises at least one of the metals selected from the group consisting of $Zr^{+4}$, $Hf^{+4}$, $Gd^{+3}$, $Al^{+3}$, $Fe^{+3}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $In^{+3}$, $Sc^{+2}$, $Y^{+2}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; where X comprises at least one of the metals selected from the group consisting of $Si^{+4}$, $Ti^{+4}$, $Al^{+4}$, $Fe^{+3}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; and where O is oxygen. Furthermore, limited substitution of S, F, Cl, and OH for oxygen in the above formula is possible in this compound as well, with a concomitant change in the numbers of A, B, and X type elements in the ideal formula, to maintain charge neutrality. Herein, oxyapatite refers broadly to $$A_4B_6X_6O_{26} \quad (II)$$

where A comprises at least one of the metals selected from the group consisting of is $Ca^{+2}$, $Mg^{+2}$, $Fe^{+2}$, $Na^{+}$, $K^{+}$, $Gd^{+3}$, $Zr^{+4}$, $Hf^{+4}$, $Y^{+2}$, $Sc^{+2}$, $Sc^{+3}$, $In^{+3}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $Sc^{+2}$, $Y^{+2}$, $Ti^{+2}$, $Zr^{+2}$, $Hf^{+2}$, $V^{+2}$, $Ta^{+2}$, $Cr^{+2}$, $W^{+2}$, $Mn^{+2}$, $Tc^{+2}$, $Re^{+2}$, $Fe^{+2}$, $Os^{+2}$, $Co^{+2}$, $Ir^{+2}$, $Ni^{+2}$, $Zn^{+2}$, and $Cd^{+2}$; where B comprises at least one of the metals selected from the group consisting of $Gd^{+3}$, $Y^{+2}$, $Sc^{+2}$, $In^{+3}$, $Zr^{+4}$, $Hf^{+4}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; where X comprises at least one of the metals selected from the group consisting of $Si^{+4}$, $Ti^{+4}$, $Al^{+4}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $C^{+3}$, $Rh^{+3}$, $Ir^{+3}$, $Ni^{+3}$, and $Au^{+3}$; and where O is oxygen. Furthermore, limited substitution of S, F, Cl, and OH for oxygen in the above formula is possible in this compound as well, with a concomitant change in the numbers of A, B, and X type elements in the ideal formula, to maintain charge neutrality.

Further, in accordance with the present invention, a turbine engine component is provided which broadly comprises a substrate and a thermal barrier coating comprising alternating layers of oxyapatite and/or garnet and a stabilized zirconia, hafnia, or titania material.

Still further, in accordance with the present invention, there is provided a method for forming a coating system which reduces sand related distress, which method broadly comprises the steps of providing a substrate and forming a coating having alternating layers of oxyapatite and/or garnet and a stabilized zirconia, hafnia, or titania material.

Other details of the silicate resistant thermal barrier coating with alternating layers of the present invention, as well as other objects and advantages attendant thereto, are set forth in the following detailed description and the accompanying drawings wherein like reference numerals depict like elements.

BRIEF DESCRIPTION OF THE DRAWINGS

The FIGURE is a schematic representation of a substrate having a silicate resistant thermal barrier coating in accordance with the present invention.

DETAILED DESCRIPTION OF THE PREFERRED EMBODIMENT(S)

It has been discovered that certain coatings react with fluid sand deposits and a reaction product forms that inhibits fluid sand penetration into the coating. The present invention relates to a coating system for a component, such as a turbine engine component, which takes advantage of this discovery.

Referring now to the FIGURE, there is shown a substrate 10 which may be a portion of a turbine engine component, such as an airfoil or a platform. The substrate 10 may be formed from any suitable metallic material known in the art such as a nickel based superalloy, a cobalt based alloy, a molybdenum based alloy, a niobium based alloy, or a titanium based alloy. Alternatively, the substrate 10 may be a ceramic based material or a ceramic matrix composite material.

The FIGURE schematically shows an optional layer 11 deposited on the substrate that consists of an oxidation resistant bondcoat. The bondcoat may be formed from any suitable oxidation resistant coating known in the art such as NiCoCrAlY or (Ni,Pt) Al bondcoats, i.e. a simple NiAl Cr PtAl bondcoat. Alternatively, and especially for ceramic substrates, the bondcoat material could consist of $MoSi_2$, or $MoSi_2$ composites containing $Si_3N_4$ and/or SiC. Furthermore, the bondcoat material could consist of elemental Si. The bondcoat layer could be formed on the substrate by any suitable technique known in the art, including air plasma spraying, vacuum plasma spraying, pack aluminizing, over-the-pack aluminizing, chemical vapor deposition, directed vapor deposition, cathodic arc physical vapor deposition, electron beam physical vapor deposition, sputtering, sol-gel, or slurry-dipping.

In accordance with the present invention, a thermal barrier coating 12 is formed on at least one surface of the substrate 10. The thermal barrier coating 12 comprises a first layer 14 of a stabilized zirconia, hafnia, or titania material deposited onto at least one surface of the substrate 10. Rare earth materials may be used to stabilize the zirconia, hafnia, or titania. The rare earth materials may be at least one oxide selected from the group consisting of lanthanum, cerium, praseodymium, neodymium, promethium, samarium, europium, gadolinium, terbium, dysprosium, homium, erbium, thulium, ytterbium, lutetium, scandium, indium, and mixtures thereof. The rare earth materials may be present in an amount from 5.0 to 99 wt %, preferably 30 to 70 wt %. Alternatively, the zirconia, hafnia, or titania, may be stabilized with from about 1.0 to 25 wt %, preferably from 5.0 to 9.0 wt %, yttria. The first layer may have a thickness in the range of from 0.5 to 50 mils, preferably from 0.5 to 5.0 mils.

After the first layer 14 has been deposited, a second layer 16 of oxyapatite and/or garnet is then applied on top of the first layer 14. The second layer 16 has a thickness from 0.5 to 50 mils, preferably from 0.5 to 5.0 mils. If the second layer contains both oxyapatite and garnet, each can be present in an amount from 5.0 to 90 wt %, preferably from 5.0 to 50 wt %.

Thereafter, this process of forming alternating layers 14 and 16 is continued until the thermal barrier coating has a desired thickness in the range of from 0.5 to 40 mils.

In a preferred embodiment of the present invention, the last or outermost layer of the thermal barrier coating 12 is an oxyapatite and/or garnet layer. The oxyapatite and/or garnet layers act as barrier to molten sand penetration into the coating.

The layers 14 and 16 may be deposited using any suitable technique known in the art. For example, each layer may be deposited using electron beam physical vapor deposition (EB-PVD) or air-plasma spray (APS). Other application methods which can be used include sol-gel techniques, slurry techniques, chemical vapor deposition (CVD), and/or sputtering.

The benefit of the present invention is a thermal barrier coating that resists penetration of molten silicate material and provides enhanced durability in environments where sand induced distress of turbine airfoils occurs. The alternating layers of oxyapatite/garnet and yttria-stabilized zirconia seal the thermal barrier coating from molten sand infiltration.

It is apparent that there has been provided in accordance with the present invention a silicate resistant thermal barrier coating with alternating layers which fully satisfies the objects, means, and advantages set forth hereinbefore. While the present invention has been described in the context of the specific embodiments thereof, other unforeseeable alternatives, modifications, and variations may become apparent to those skilled in the art having read the foregoing description. Accordingly, it is intended to embrace those alternatives, modifications, and variations as fall within the broad scope of the appended claims.

What is claimed is:

1. A thermal barrier coating system for use on a turbine engine component which reduces sand related distress, said coating system comprising a plurality of first layers of a stabilized material selected from the group consisting of zirconia, hafnia, and titania and a plurality of second layers containing at least one of oxyapatite and garnet, said first layers and said second layers being alternating, and an outermost layer of said thermal barrier coating comprising a second layer.

2. The thermal barrier coating of claim 1, wherein said first layer comprises a material selected from the group consisting of zirconia, hafnia, and titania stabilized with a rare earth material comprises at least one oxide selected from the group consisting of lanthanum, cerium, praseodymium, neodymium, promethium, samarium, europium, gadolinium, terbium, dysprosium, homium, erbium, thulium, ytterbium, lutetium, scandium, indium and mixtures thereof.

3. The thermal barrier coating of claim 2, wherein said rare earth material is present in an amount from 5.0 to 99 wt %.

4. The thermal barrier coating of claim 2, wherein said rare earth material is present in an amount from 30 to 70 wt %.

5. The thermal barrier coating of claim 1, wherein said first layer comprises a material selected from the group consisting of zirconia, hafnia, and titania stabilized with yttria.

6. The thermal barrier coating of claim 5, wherein said yttria is present in an amount from 1.0 to 25 wt %.

7. The thermal barrier coating of claim 5, wherein said yttria is present in an amount from 5.0 to 9.0 wt %.

8. The thermal barrier coating of claim 1, wherein each said second layer contains garnet having the formula $A_3B_3X_3O_{12}$ where A comprises at least one of the metals selected from the group consisting of $Ca^{+2}$, $Gd^{+3}$, $In^{+3}$, $Mg^{+2}$, $Na^{+}$, $K^{+}$, $Fe^{+2}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $Sc^{+2}$, $Y^{+2}$, $Ti^{+2}$, $Zr^{+2}$, $Hf^{+2}$, $V^{+2}$, $Ta^{+2}$, $Cr^{+2}$, $W^{+2}$, $Mn^{+2}$, $Tc^{+2}$, $Re^{+2}$, $Fe^{+2}$, $Os^{+2}$, $Co^{+2}$, $Ir^{+2}$, $Ni^{+2}$, $Zn^{+2}$, and $Cd^{+2}$; where B comprises at least one of the metals selected from the group consisting of $Zr^{+4}$, $Hf^{+4}$, $Gd^{+3}$, $Al^{+3}$, $Fe^{+3}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $In^{+3}$, $Sc^{+2}$, $Y^{+2}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; where X comprises at least one of the metals selected from the group consisting of $Si^{+4}$, $Ti^{+4}$, $Al^{+4}$, $Fe^{+3}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; and where O is oxygen.

9. The thermal barrier coating of claim 1, wherein each said second layer consists solely of garnet.

10. The thermal barrier coating of claim 1, wherein each said first layer has a thickness in the range of from 0.5 to 50 mils.

11. The thermal barrier coating of claim 1, wherein each said first layer has a thickness in the range of from 0.5 to 5.0 mils.

12. The thermal barrier coating of claim 1, wherein each said second layer has a thickness in the range of from 0.5 to 50 mils.

13. The thermal barrier coating of claim 1, wherein each said second layer has a thickness in the range of from 0.5 to 5.0 mils.

14. The thermal barrier coating of claim 1, wherein said thermal barrier coating has a thickness in the range of from 0.5 to 40 mils.

15. A thermal barrier coating system for use on a turbine engine component which reduces sand related distress, said coating system comprising at least one first layer of a stabilized material selected from the group consisting of zirconia, hafnia, and titania and at least one second layer consisting solely of oxyapatite.

16. The thermal barrier coating of claim 15, comprising a plurality of first layers and a plurality of second layers wherein said first layers and said second layers are alternating.

17. The thermal barrier coating of claim 16, wherein an outermost layer of said thermal barrier coating comprises a second layer.

18. A thermal barrier coating system for use on a turbine engine component which reduces sand related distress, said coating system comprising at least one first layer of a stabilized material selected from the group consisting of zirconia, hafnia, and titania and at least one second layer containing at least one of oxyapatite and garnet, wherein each said second layer contains an oxyapatite having the formula $A_4B_6X_6O_{26}$ where A comprises at least one of the metals selected from the group consisting of is $Ca^{+2}$, $Mg^{+2}$, $Fe^{+2}$, $Na^{+}$, $K^{+}$, $Gd^{+3}$, $Zr^{+4}$, $Hf^{+4}$, $Y^{+2}$, $Sc^{+2}$, $Sc^{+3}$, $In^{+3}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $Sc^{+2}$, $Y^{+2}$, $Ti^{+2}$, $Zr^{+2}$, $Hf^{+2}$, $V^{+2}$, $Ta^{+2}$, $Cr^{+2}$, $W^{+2}$, $Mn^{+2}$, $Tc^{+2}$, $Re^{+2}$, $Fe^{+2}$, $Os^{+2}$, $Co^{+2}$, $Ir^{+2}$, $Ni^{+2}$, $Zn^{+2}$, and $Cd^{+2}$; where B comprises at least one of the metals selected from the group consisting of $Gd^{+3}$, $Y^{+2}$, $Sc^{+2}$, $In^{+3}$, $Zr^{+4}$, $Hf^{+4}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; where X comprises at least one of the metals selected from the group consisting of $Si^{+4}$, $Ti^{+4}$, $Al^{+4}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; and where O is oxygen.

19. A thermal barrier coating system for use on a turbine engine component which reduces sand related distress, said coating system comprising at least one first layer of a stabilized material selected from the group consisting of zirconia, hafnia, and titania and at least one second layer containing at least one of oxyapatite and garnet, wherein said second layer consists of from 5.0 to 90 wt % of oxyapatite and the balance being garnet.

20. The thermal barrier coating of claim 19, wherein each said second layer consists of from 5.0 to 50 wt % of oxyapatite and the balance being garnet.

21. A turbine engine component comprising:

a substrate and a thermal barrier coating deposited onto said substrate; and said thermal barrier coating comprising a plurality of first layers of a stabilized material selected from the group consisting of zirconia, hafnia, and titania and a plurality of second layers containing at least one of oxyapatite and garnet, said first layers and said second layers being alternating, and an outermost layer of said thermal barrier coating comprising a second layer.

22. The turbine engine component of claim 21, wherein said first layer comprises a material selected from the group consisting of zirconia, hafnia, and titania stabilized with a rare earth material comprises at least one oxide selected from the group consisting of lanthanum, cerium, praseodymium, neodymium, promethium, samarium, europium, gadolinium, terbium, dysprosium, homium, erbium, thulium, ytterbium, lutetium, scandium, indium and mixtures thereof.

23. The turbine engine component of claim 22, wherein said rare earth material is present in an amount from 5.0 to 99 wt %.

24. The turbine engine component of claim 22, wherein said rare earth material is present in an amount from 30 to 70 wt %.

25. The turbine engine component of claim 21, wherein said first layer comprises a material selected from the group consisting of zirconia, hafnia, and titania stabilized with yttria.

26. The turbine engine component of claim 25, wherein said yttria is present in an amount from 1.0 to 25 wt %.

27. The turbine engine component of claim 25, wherein said yttria is present in an amount from 5.0 to 9.0 wt %.

28. The turbine engine component of claim 21, wherein each said second layer consists solely of garnet.

29. The turbine engine component of claim 21, wherein each said first layer has a thickness in the range of from 0.5 to 50 mils.

30. The turbine engine component of claim 21, wherein each said first layer has a thickness in the range of 0.5 to 5.0 mils.

31. The turbine engine component of claim 21, wherein each said second layer has a thickness in the range of from 0.5 to 50 mils.

32. The turbine engine component of claim 21, wherein each said second layer has a thickness in the range of from 0.5 to 5.0 mils.

33. The turbine engine component of claim 21, wherein said thermal barrier coating has a thickness in the range of from 0.5 to 40 mils.

34. The turbine engine component of claim 21, wherein said substrate is formed from a metallic material selected from the group consisting of a nickel based superalloy, a cobalt based alloy, a molybdenum based alloy, a niobium based alloy, a titanium based alloy, a ceramic based material and a ceramic matrix composite material.

35. The turbine engine component according to claim 21, wherein each said second layer contains an oxyapatite having the formula $A_4B_6X_6O_{26}$ where A comprises at least one of the metals selected from the group consisting of is $Ca^{+2}$, $Mg^{+2}$, $Fe^{+2}$, $Na^{+}$, $K^{+}$, $Gd^{+3}$, $Zr^{+4}$, $Hf^{+4}$, $Y^{+2}$, $Sc^{+2}$, $Sc^{+3}$, $In^{+3}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $Sc^{+2}$, $Y^{+2}$, $Ti^{+2}$, $Zr^{+2}$, $Hf^{+2}$, $V^{+2}$, $Ta^{+2}$, $Cr^{+2}$, $W^{+2}$, $Mn^{+2}$, $Tc^{+2}$, $Re^{+2}$, $Fe^{+2}$, $Os^{+2}$, $Co^{+2}$, $Ir^{+2}$, $Ni^{+2}$, $Zn^{+2}$, and $Cd^{+2}$; where B comprises at least one of the metals selected from the group consisting of $Gd^{+3}$, $Y^{+2}$, $Sc^{+2}$, $In^{+3}$, $Zr^{+4}$, $Hf^{+4}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; where X comprises at least one of the metals selected from the group consisting of $Si^{+4}$, $Ti^{+4}$, $Al^{+4}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; and where O is oxygen.

36. The turbine engine component according to claim 21, wherein each said second layer contains a garnet having the formula $A_3B_2X_3O_{12}$ where A comprises at least one of the metals selected from the group consisting of is $Ca^{+2}$, $Gd^{+3}$, $In^{+3}$, $Mg^{+2}$, $Na^{+}$, $K^{+}$, $Fe^{+2}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $Sc^{+2}$, $Y^{+2}$, $Ti^{+2}$, $Zr^{+2}$, $Hf^{+2}$, $V^{+2}$, $Ta^{+2}$, $Cr^{+2}$, $W^{+2}$, $Mn^{+2}$, $Tc^{+2}$, $Re^{+2}$, $Fe^{+2}$, $Os^{+2}$, $Co^{+2}$, $Ir^{+2}$, $Ni^{+2}$, $Zn^{+2}$, and $Cd^{+2}$; where B comprises at least one of the metals selected from the group consisting of $Zr^{+4}$, $Hf^{+4}$, $Gd^{+3}$, $Al^{+3}$, $Fe^{+3}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $In^{+3}$, $Sc^{+2}$, $Y^{+2}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; where X comprises at least one of the metals selected from the group consisting of $Si^{+4}$, $Ti^{+4}$, $Al^{+4}$, $Fe^{+3}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; and where O is oxygen.

37. The turbine engine component according to claim 21, further comprising a bondcoat.

38. The turbine engine component according to claim 21, wherein said bondcoat is formed from at least one material selected from the groups consisting of NiCoCrAlY, NiAl, PtAl, $MoSi_2$, a $MoSi_2$ composite containing $Si_3Ny$ and/or SiC, and Si.

39. A turbine engine component comprising:

a substrate and a thermal barrier coating deposited onto said substrate; and said thermal barrier coating comprising at least one first layer of a stabilized material selected from the group consisting of zirconia, hafnia, and titania and at least one second layer consisting solely of oxyapatite.

40. The turbine engine component of claim 39, comprising a plurality of first layers and a plurality of second layers wherein said first layers and said second layers are alternating.

41. The turbine engine component of claim 40, wherein an outermost layer of said thermal barrier coating comprises a second layer.

42. A turbine engine component comprising:

a substrate and a thermal barrier coating deposited onto said substrate; and said thermal barrier coating comprising at least one first layer of a stabilized material selected from the group consisting of zirconia, hafnia, and titania and at least one second layer containing oxyapatite and garnet, wherein each said second layer consists of from 5.0 to 90 wt % of oxyapatite and the balance being garnet.

43. The turbine engine component of claim 42, wherein each said second layer consists of from 5.0 to 50 wt % of oxyapatite and the balance being garnet.

* * * * *